M. G. HUBBARD.
VENTILATOR UNIT.
APPLICATION FILED APR. 17, 1917.
1,296,394.
Patented Mar. 4, 1919.
6 SHEETS—SHEET 2.
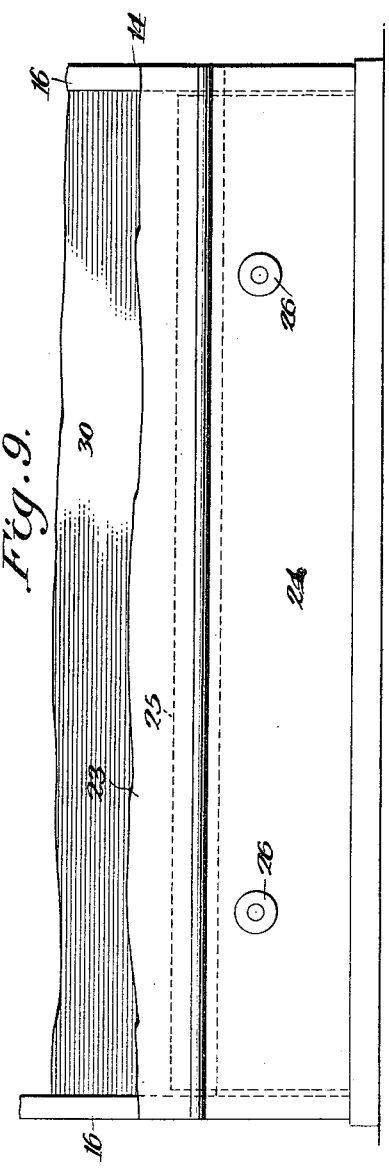
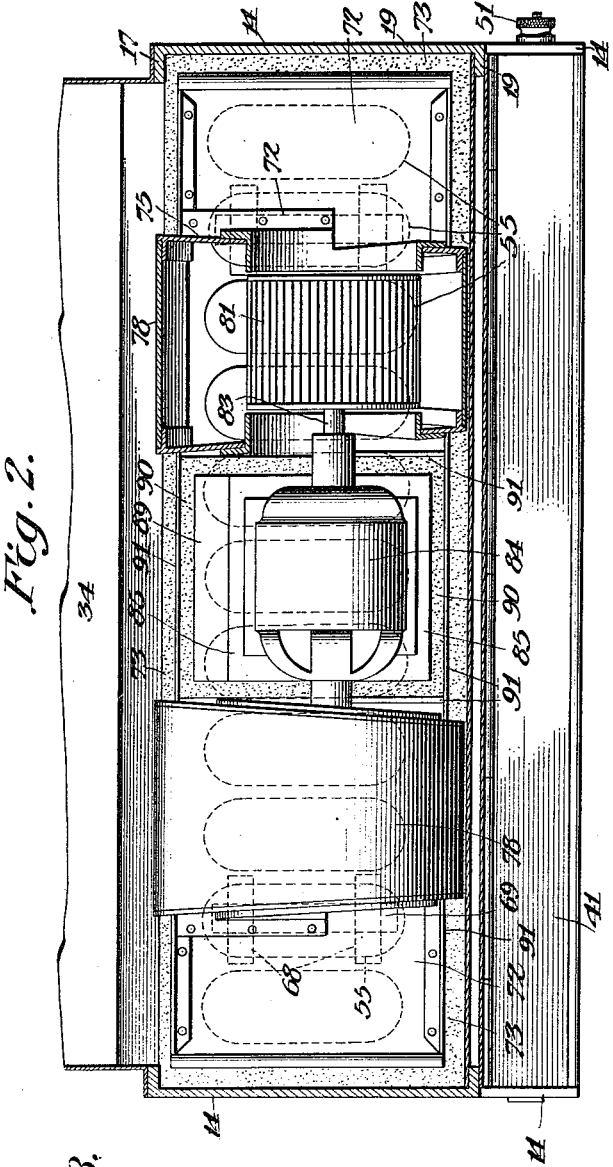
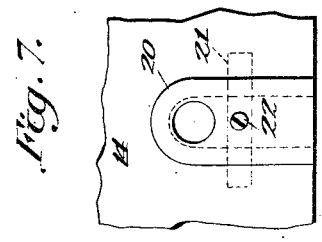
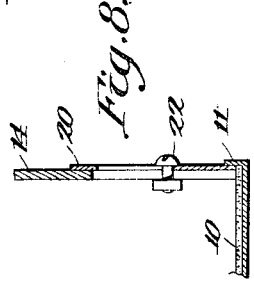
Inventor:
Moses G. Hubbard,
By Knight Bros.
Attys.

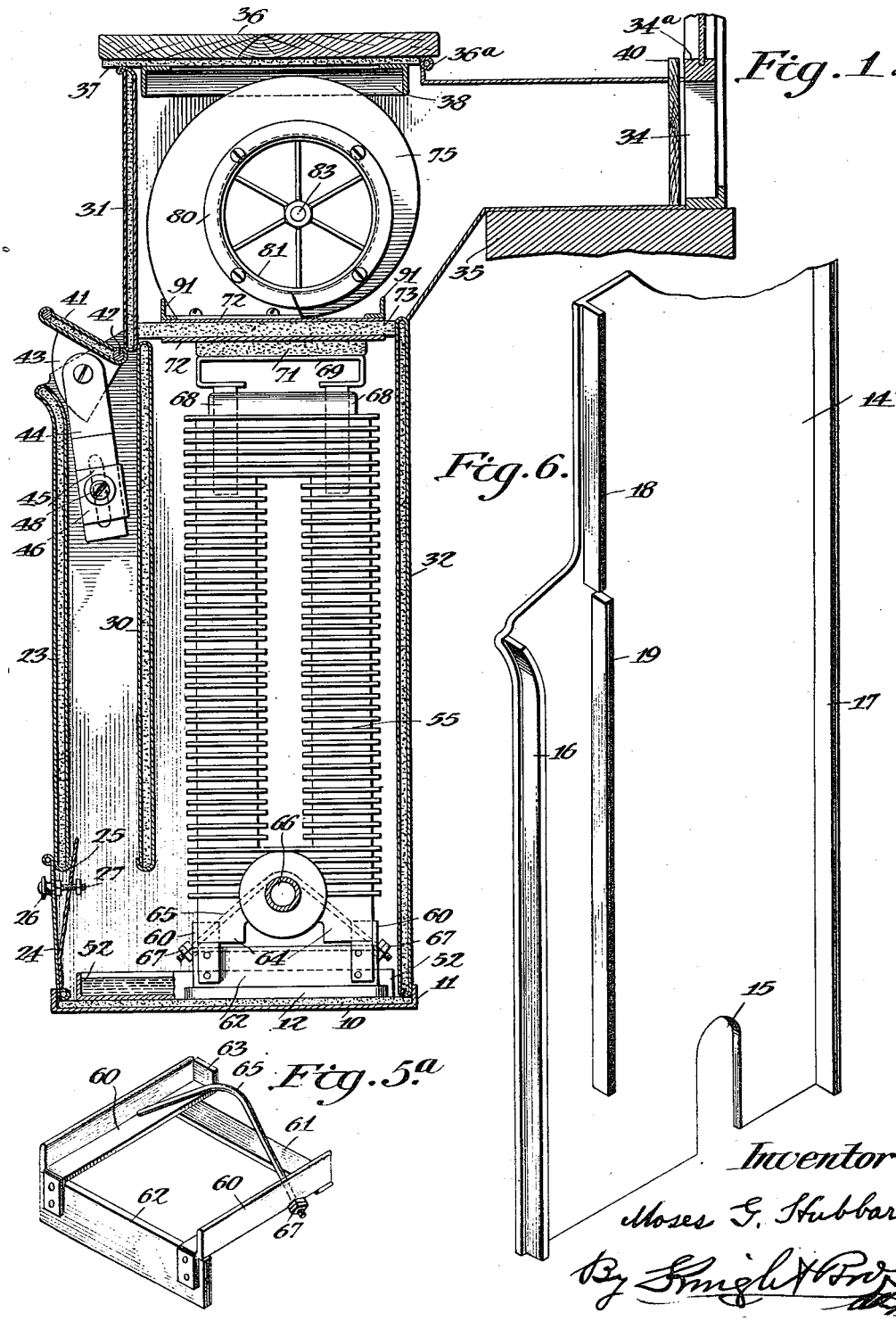

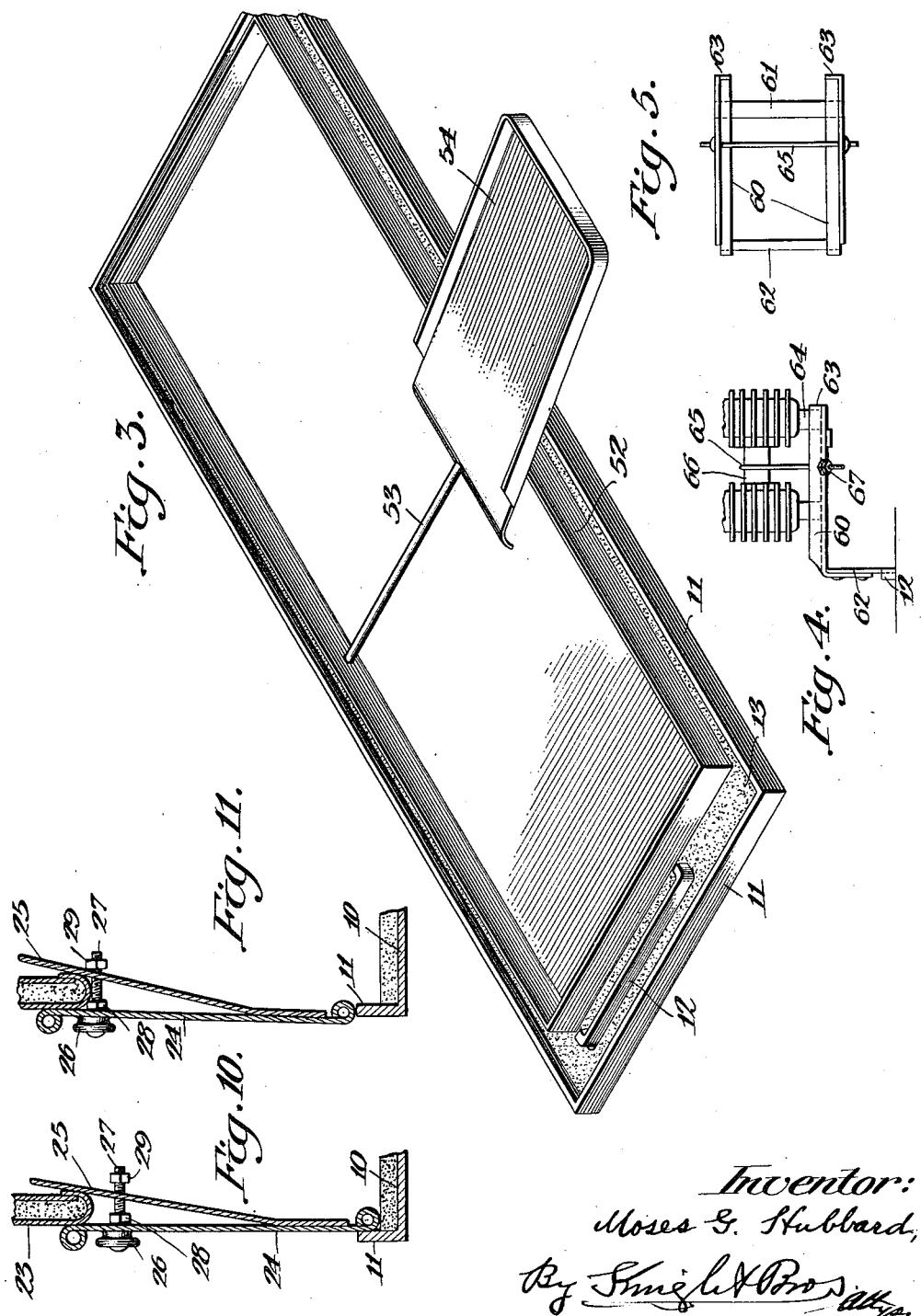

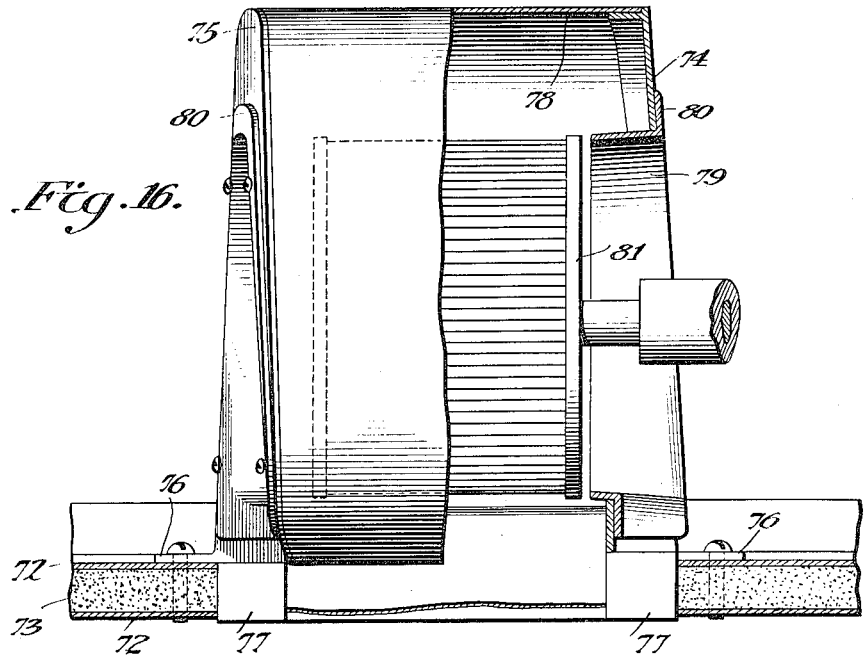
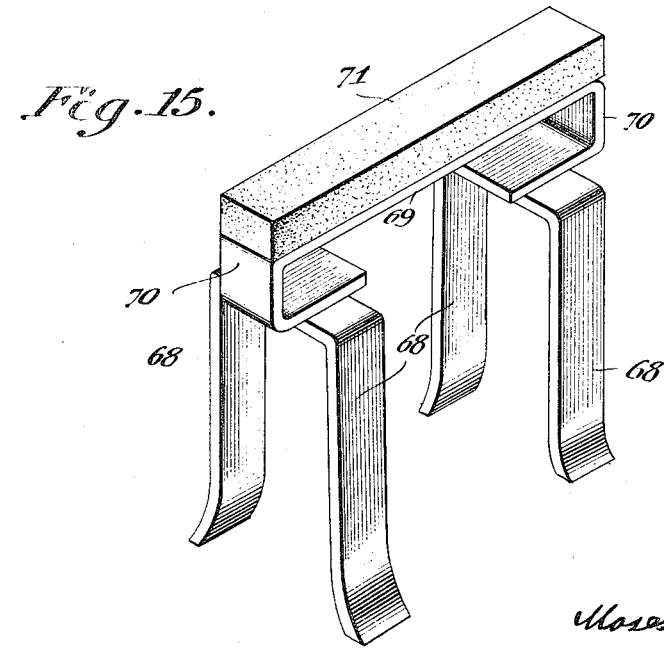

M. G. HUBBARD.
VENTILATOR UNIT.
APPLICATION FILED APR. 17, 1917.

1,296,394.

Patented Mar. 4, 1919.
6 SHEETS—SHEET 6.

Inventor:
Moses G. Hubbard,
By Knight & Bros.
Attys.

UNITED STATES PATENT OFFICE.

MOSES G. HUBBARD, OF SUMMIT, NEW JERSEY, ASSIGNOR, BY MESNE ASSIGNMENTS, TO MOLINE HEAT, OF MOLINE, ILLINOIS, A CORPORATION OF ILLINOIS.

VENTILATOR UNIT.

1,296,394.   Specification of Letters Patent.   Patented Mar. 4, 1919.

Original application filed August 6, 1913, Serial No. 783,346. Divided and this application filed April 17, 1917. Serial No. 163,443.

*To all whom it may concern:*

Be it known that I, MOSES G. HUBBARD, a citizen of the United States, residing in Summit, county of Union, State of New Jersey, have invented certain new and useful Improvements in Ventilator Units, of which the following is a full and clear specification.

The present application is a division of my prior application entitled "Ventilating unit," filed August 6th, 1913, upon which Patent No. 1,223,978 was granted April 24th, 1917.

My invention relates in general to apparatus for the ventilation of buildings, such as offices, stores, school houses, dwellings and the like. Certain features of the invention are applicable to the delivery or distribution of air and other gases generally, as for example, in industrial processes. I shall refer to this entire field as ventilation without regard as to whether the ventilation is employed to supply air to rooms or air and other gases to industrial uses, such as drying operations, the support of combustion, and the like. The embodiment of the invention which I have herein chosen for clear illustration of the principles involved is designed more especially for employment in connection with the supply of fresh heated air to rooms of buildings.

Among the objects of my invention are first of all, efficiency in operation, simplicity and cheapness of construction and convenience and quiteness in use. Other objects and advantages will be apparent to those familiar with this art, upon consideration of the specific embodiment of the apparatus shown in the accompanying drawings and herein described with reference thereto. The apparatus comprises in general a heater, a blower, and a housing inclosing the heater and blower, whereby the air is supplied to the blower and from there delivered to the heater, and the heated air finally discharged into the room.

In the drawings,

Figure 1 is a side elevation with the end wall of the housing removed, showing the blower, heater and ventilator housing;

Fig. 2 is a top plan view of the same with the cover of the housing removed;

Fig. 3 is a perspective view showing the independent housing base and water tank;

Figure 14:
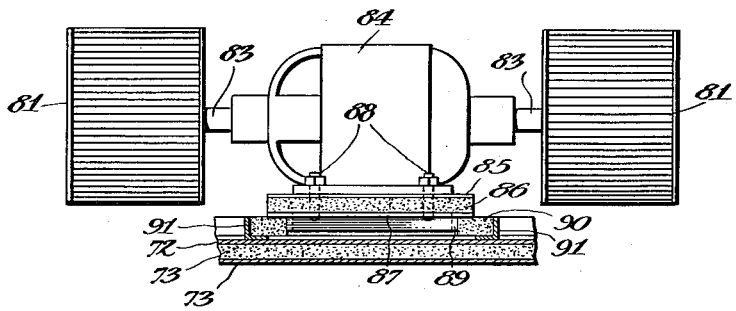
Figure 13:
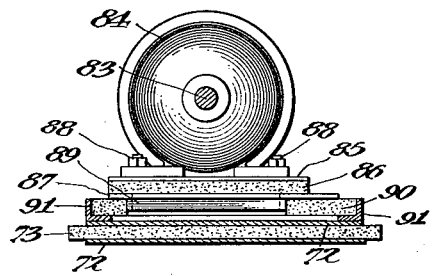
Figure 12:
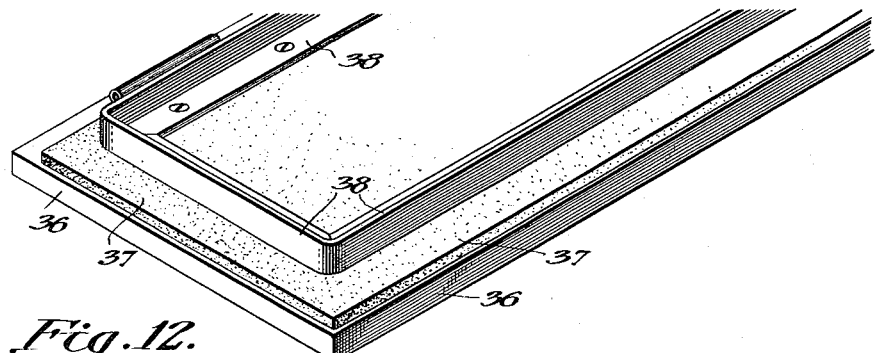
Figure 17:
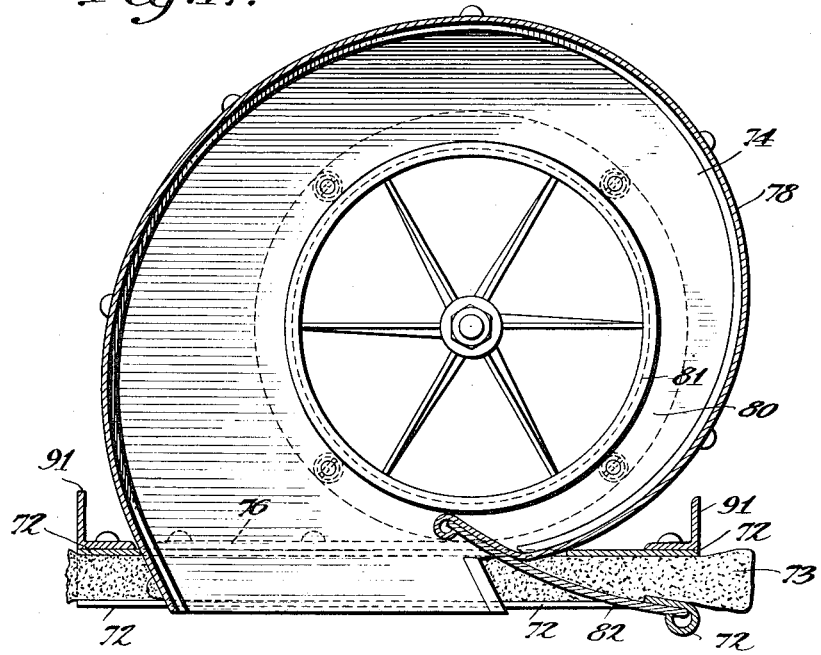
Figure 18:
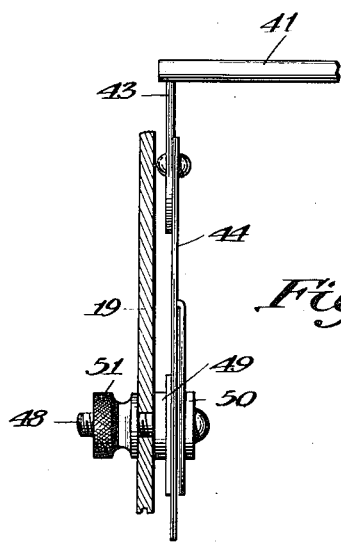
Figure 19:
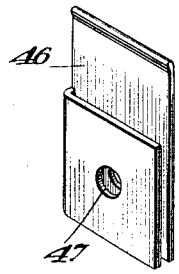

Figs. 4, 5 and 5ª are detail elevation, plan and perspective views respectively of the detachable feet for the heater;

Fig. 6 is a perspective view of one of the end castings forming the end wall of the ventilator housing;

Fig. 7 is a detail elevation of the detachable cover plate for closing the opening through which the steam or other supply pipe for the heater passes;

Fig. 8 is a vertical section of the same;

Fig. 9 is a front elevation of the lower portion of the ventilator housing, showing the removable panel providing access to the water tank;

Figs. 10 and 11 are vertical sections of the same in normal position and position of removal, respectively;

Fig. 12 is a perspective view of the under side of the housing cover;

Fig. 13 is an end elevation of the fan motor and its supporting parts;

Fig. 14 is a front elevation of the same with the blower fans;

Fig. 15 is a perspective view of one of the removable seats adapted to be readily positioned upon the heater for supporting the blower unit base;

Fig. 16 is a front elevation with parts in section showing a blower fan and snail shell casing positioned in its support;

Fig. 17 is a transverse elevation of the same with the end wall of the snail shell casing removed;

Fig. 18 is a detail elevation with parts in section, showing one of the friction slides at the end of the air discharge deflector, and Fig. 19 is a detail perspective of a friction plate employed therein.

In apparatus of this nature, it is of primary importance to reduce the noise of moving parts to a minimum. For this reason, it it necessary to so construct the ventilator housing as to dampen, or entirely do away with vibration of metallic parts and to insulate from each other, those parts with respect to which relative movement occurs, as for example, the moving parts of the blower and all stationary parts. As will be seen, I provide for this by a special construction of doubled walled ventilator housing, and by mounting the moving parts of the blower upon a cushion support without directly connecting them with the stationary parts, such as the fan casings, the ventilator housing, or the heater.

The ventilator housing rests upon an independent base formed of the bottom 10 and side and end flanges 11. The bottom 10 has secured to it near either end thereof, guides or cleats 12, which retain the heater support in position, as will be shown. A sealing pad 13 of felt or other suitable material covers the bottom 10 and upon this and within the flanges rest the walls of the housing. One of the end walls 14 is shown in perspective in Fig. 6. The end wall is in the form of a cast plate having a slot 15, through which passes a steam or other pipe for the heater, and provided with a front flange 16, rear flange 17 and intermediate flanges 18 and 19. These flanges are for the attachment of the front and rear walls of the housing and the intermediate compartment wall or panel between the heater and the air passage, as will be seen. A cover plate 20, as shown in Figs 7 and 8, provided with a perforation through which the steam pipe may pass, is fitted over the slot 15 and clamped in place by means of a cross plate 21 and bolt 22, so as to effectively close the slot 15 against the escape of air during the operation of the blower. Embracing and secured to the flanges 16 of the two end plates is the sheet metal double wall 23, forming the front of the housing. Below the double wall 23, the space is closed by a removable panel piece, as shown in Figs. 1, 9, 10 and 11, comprising the front plate 24, which extends across the entire width of the housing at the bottom, and the resilient inner plate 25, which is shorter than the front plate 24, so as to pass freely through the space beneath the wall 23 and between the flanges 16, to hold the front plate in place by engagement in the rear of the front wall 23, as shown. Knobs 26 are provided for manipulation of the removable panel and through these knobs pass bolts 27, which are disposed in perforations formed in plates 24 and 25, with nuts 28 and 29 threaded thereon. The inner nut 28 fixes the bolt 27 and knob 26 against the front plates 24, whereas the nut 29 serves to limit the play of plate 25 and may be suitably positioned to properly adjust the plate 25, which is thus made to serve as a yielding retainer for the front plate 24. The plate 25 has sufficient elasticity to accommodate the action of inserting and removing the panel, and the bolts 27 are so placed as to engage the bottom of front wall 23, before the retaining plate is deflected beyond its elastic limit in manipulation.

Flanges 19 are embraced by and have secured to them, the sheet metal double walled partition or baffle 30, whereas flanges 18 are embraced by and have secured to them, the sheet metal double wall 31. Double wall 30 forms the front of the heater chamber, while double wall 31 forms the front of the blower chamber, to be described. Embraced by and attached to the flanges 17 is the sheet metal double wall 32, forming the back of the heater chamber.

The double walls 23, 30, 31 and 32, which have been described, are all similar in principle of construction. These walls are formed by folded sheet metal slipped over their respective flanges and they are in each case filled with a suitable sound dampening substance, such as for example, sawdust, felt or the like, whereby vibration of the sheet metal is prevented, and the transmission of sound through them reduced to a minimum.

Above the rear wall 32 of the ventilator housing, I attach the air intake duct 33, which is secured at its sides to the rear flanges 17 on end plates 14, as shown in Fig. 2, and at the bottom to the rear wall 32. It will be observed from Fig. 1 that this air intake duct 33 is of a particular shape or form with respect to the window casing 34 and the sill 35, and that its forward portion is flared to lend additional volume to the blower chamber or compartment, which feature is of material importance in the economy of space required by the ventilating unit, as will be seen.

The top of the housing is formed preferably by a wooden board 36, provided with a layer of felt, or the like, 37, and stiffened and weighted by a rectangular frame 38 of angle iron, or the like, which is secured thereto, as shown in Figs. 1 and 12. The top thus formed may be hinged at 36ª to the rear of the housing, as shown in Fig. 1.

It will be seen that the ventilator housing constructed as described provides in general three chambers, namely, the blower chamber at the top, the heater chamber immediately below it and the discharge chamber or passageway in front of the heating compartment. The entrance of air into the air duct 33 is controlled by a slide 40, or the window sash 34ª operating in window frame 34, as will be clear from Fig. 1 of the drawing. During the operation of the blower fan, air is introduced into the air duct 33, and if the sash 34ª be raised as shown in Fig. 1, the air introduced will be fresh air from outdoors or outside the window, whereas when the sash 40 is lowered the air introduced will be from the room. This latter condition provides for rapidly heating the air contained within the room when the renewal of the air is unnecessary, as in the case of school rooms on cold mornings before the room is occupied. After the proper temperature has been obtained and the room is occupied, the sash 40 will be raised to admit fresh air.

The discharge of air from the ventilator housing occurs through the passageway between double walls 23 and 30 at the front of the housing and the direction of the discharge may be regulated through the adjustment of a hinged cover or deflector 41, which is made of sheet metal filled with felt or the like, as above described with reference to the double walls of the housing. This adjustable deflector is hinged at 42 and has fixed to it at either end, a vertical plate 43, as shown in Figs. 1 and 18. This plate has pivoted to it an intermediate plate or link 44, which is slotted at 45 (Fig. 1) and slides within the friction plate 46, the details of which are illustrated in Fig. 19. This friction plate 46 comprises two leaves folded into parallel relation with a space between them suitable for the accommodation of the slotted link 44. Each leaf is perforated at 47 so that a bolt 48 may pass through them and adjustably secure them together, as illustrated in Fig. 18. A washer or spacing disk may be disposed between the smaller or outer leaf of the friction plate 46 and a washer 50 may be set against the inner lead, so that by means of a knurled nut 51 or the like, disposed on bolt 48 outside of the perforated housing wall, through which bolt 48 passes, the friction on plate 46 and plate 44 may be adjusted and the hinged cover or deflector 41 thus fixed in any desired position. One leaf of the friction plate is extended so as to conceal the slot in link 44 and support the link against buckling. It will be observed from Fig. 1 that the hinge 42 is higher than the top of front wall 23, thereby permitting such adjustment of the hinged deflector 41 as to direct a draft of air horizontally or even below the horizontal direction, if desired. When the deflector 41 is raised into vertical position, the discharge of air occurs approximately vertically.

One of the important features of the housing construction resides in the elongated or narrow shape of the air discharge. For the discharge of a given quantity of air into a room, better distribution and less draft is accomplished in this way.

In order to remove dust and foreign matter from the air, and in order to properly humidify the heated air, I provide a water tank 52, which is disposed at the bottom of the heater compartment and rests upon the felt pad 13 of the base 10, as illustrated in Figs. 1 and 3. This water tank 52 is provided with a transverse bar or rod 53 passing through the down turned lip of a slidable or extensible tray or trough 54 which may thus be drawn out after removing bottom panel 24 already described, for facilitating the introduction of water into the water tank 52. The surface of the water in the water tank 52 is transversely in the path of the air current and thus acts as a deflector to the downward current of heated air, so that the air is thoroughly subjected to the washing and humidifying effect of the water. A large proportion of the dust and foreign matter is thereby removed, and the air thus cleansed and supplied with moisture before it is discharged into the room.

The present invention does not require any particular form of heater or blower for the successful operation of the parts already described. The housing of the ventilator is operative and useful with various forms of blowers and heaters. I have herein shown, however, a novel form of blower, and a type of heater which I have found to offer important advantages in practical operation. The heater herein shown is in the form of a steam heat radiator 55, as shown in Figs. 1 and 4 of the drawing. This radiator I may mount upon any suitable support, but I prefer to mount it on detachable extension feet as illustrated in Figs. 3, 4, 5 and 5ᵃ.

These feet are herein shown by way of example as comprising two parallel angle iron strips 60, each bent at a right angle so as to form vertical legs and horizontal arms. The two angle irons are united by cross bars 60 and 62 and an end flange 63 is turned up at the inner end of each arm to form a positioning stop adapted to rest against the lower base 64 of one of the radiator units, as shown in Fig. 4. In this position a tie rod 65, which passes through a perforation in each of the horizontal arms of the angle iron 60 and over the connection 66, between two of the radiator units, binds the support in place by means of nuts 67. The vertical legs rest within the flanges 12 on the independent base 10.

It will be apparent that with the form of radiator support and ventilator housing shown, the radiator may be set in place upon the independent base 10 before the housing is set up. The housing may then be placed over the radiator, slot 15 in the end wall 14, shown in Fig. 6, permitting placing and removal of the housing for the radiator without interference from the steam pipe of the radiator. It will be observed that the plate 20 should be slipped over the steam pipe before the radiator is connected and that after placing the casing or housing in position, the plate 20 may be secured over the slot 15 in the end wall 14 to close the bottom of the heater compartment.

The ventilator housing being the chief medium for the transmission of sound from the operating mechanism, it is important that the apparatus for delivering the air be supported entirely independently of this housing. For this purpose, I provide an independent vertical support, on which the blower and a cushion shelf receive their entire vertical support, while horizontal or direction supports and an air seal are provided between the edges of this cushion shelf and the walls of the main housing, composed of a flexible or resilient packing, which will adjust itself and automatically seal the contact between the edges of the cushion shelf and the walls of the main housing against the passage of air. This cushion shelf and the blowers and casing form a removable unit and the resilient packing above referred to permits the removal of this unit and its replacement without disassembling the individual parts.

The blower apparatus in the present instance, derives its vertical support from the heater. To further minimize the noise, I provide the cushion shelf referred to, by which the blower may rest upon and be supported by the heater and receive horizontal or direction support. This cushion shelf at the same time forms and seals the top of the heating chamber or compartment and in it are formed the communicating passages from the blower chamber to the heater chamber as will be described.

As shown in Figs. 1 and 15, removable cushion seats are provided for the top of the radiator, comprising the spring clamps 68, two of these clamps being joined by a seat portion 70 upon which is laid a cushion 71 of felt, or the like. Two or more of these removable seats are clamped upon the radiator units, as illustrated in Fig. 1, the clamping feet 68 being adapted to yieldingly engage the upper ends of the radiator units and be pressed down until they rest in firm contact with the top of the radiator. Upon these cushions 71 is placed the cushion shelf or table formed of two sheet metal plates 72, embracing between them a felt pad 73, or the like, fitting within the transverse area of the housing and sealing the joint by its yielding engagement with the walls. These plates 72 and the pad 73 are perforated to form discharge passages from the fan blowers, as will be shown.

The blower unit comprises in the present instance, a pair of fan casings, and independently mounted thereof, a motor with a pair of fan wheels or rotors, which are adapted to work within the fan casings. The rotary parts of the blower apparatus or unit are removably seated in pockets formed in the cushion support and the positive securing of any of these parts to stationary metallic portions of the ventilator housing or frame work, is carefully avoided as a source of noise. Fig. 16 illustrates the construction and mounting of the fan casings, each of which comprises in general two side castings 74 and 75, flanged at 76, and provided with downward extensions 77, so that the fan casing is seated within perforations of the plates 72 and the pad 73 and bolted down as shown. An outer wall 78 is secured to the inner flanges of the castings 74 and 75, and inner sleeves 79 and 80 are fixed within the castings 74 and 75, thus forming inner peripheral walls extending inwardly toward the rotor and terminating in a circle parallel therewith and in close proximity thereto. The air enters the blower axially at either side or end and is driven circumferentially or tangentially outward by a revolving fan cage 81, such as set forth, for example, in my prior Patent No. 902,533. A plate 82 of sheet metal is inserted under a tongue of the felt 73 and the overturned edge of the metal sheet 78, immediately in front of the discharge port, as shown clearly in Fig. 17.

Rotors or fan cages 81 are mounted on the shaft 83 of motor 84 as shown in Fig. 14. The motor 84 is fixed upon an adjustable base comprising in the example shown, upper plate 85, cushion 86 and skeleton frame casting 87, the parts 85, 86, 87 being secured together by bolts, or the like, 88. The skeleton frame has a rectangular lower flange 89, which fits within a pocket formed in the cushion 90, secured within an angle iron frame 91, upon the upper plate 72 to the main cushion shelf above described. In this way the rotating parts are positively located without being rigidly attached to other metallic parts. The rotating parts, including the motor, rest in their proper position by gravity alone. By turning the bolts 88, the upper plate 85 may be moved toward or away from the lower skeleton frame 87, thereby adjusting the height of the rotors 81 and suitably alining them within the stationary snail shell casings.

The improved snail shell casing and motor mounting are not claimed in the present application but form the subject matter of my divisional applications, Serial No. 267,375 for improvements in fan or blower, and Serial No. 267,376 for improvements in motor supports for ventilator units, both filed December 18th, 1918.

What I claim is:—

1. A ventilator having a housing provided with an air intake and air outlet and comprising in combination a pair of flanged end plates, and double front and rear walls embracing and secured to the flanges of said end plates and packed with sound insulating material.

2. A ventilator having a housing provided with an air intake and an air outlet and comprising in combination a pair of flanged end castings and double sheet metal front and rear walls embracing and secured to the flanges of said end castings and packed with sound insulating material.

3. A ventilator having a housing provided with an air intake and an air outlet and comprising in combination a pair of end plates having front, rear and intermediate flanges, and double front, rear and intermediate walls embracing and secured to the respective flanges, said double walls being packed with sound insulating material and forming separate communicating compartments.

4. A ventilator having a housing provided with an air intake and an air outlet and comprising in combination, a pair of flanged end plates, double front and rear walls embracing and secured to the flanges of said end plates and packed with sound insulating material, and a housing cover comprising a wooden board padded beneath and stiffened and weighted with an angle iron frame.

5. A ventilator comprising in combination a heater, a blower for supplying air thereto, a water tank disposed below said heater and transversely in the path of the current of air therefrom, and a housing for said heater, blower and water tank having a removable panel for giving access to the water tank.

6. A ventilator comprising in combination a heater, a blower for supplying air thereto, a water tank having an extensible filling trough, disposed below said heater and transversely in the path of the current of air therefrom, and a housing for said heater, blower and water tank having a removable panel for giving access to the water tank.

7. A ventilator comprising in combination a heater, a blower for supplying air thereto, a water tank disposed below said heater and transversely in the path of the current of air therefrom, a housing for said heater, blower and water tank having a removable panel for giving access to the water tank, and a padded base for supporting said housing and water tank.

8. A unit ventilator comprising a main housing, an air intake, an upper chamber connected to said air intake, a motor and blower mounted in said upper chamber, a lower chamber, an air passage connecting said blower and said lower chamber, a heating device mounted in said lower chamber, a water tank in the base of said lower chamber underneath said heating device, and an air outlet extending upward from the lower part of said lower or heating chamber.

MOSES G. HUBBARD.